US007493816B1

(12) United States Patent
Petrovic et al.

(10) Patent No.: US 7,493,816 B1
(45) Date of Patent: Feb. 24, 2009

(54) SMOKE DETECTORS

(75) Inventors: Dragan P. Petrovic, Geneva, IL (US); Lorenzo Luterotti, Gorizia (IT)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/864,119

(22) Filed: Sep. 28, 2007

(51) Int. Cl.
*G01H 17/00* (2006.01)
*G01N 37/00* (2006.01)
*G08B 17/10* (2006.01)

(52) U.S. Cl. .................... 73/570.5; 73/24.02; 73/28.01; 73/31.01; 73/31.02; 73/31.03; 340/628; 340/629; 340/630

(58) Field of Classification Search ................ 73/34.02, 73/28.01, 31.01, 31.02, 31.03, 570.5; 340/628, 340/629, 630
See application file for complete search history.

(56) References Cited

U.S. PATENT DOCUMENTS 3,771,286 A * 11/1973 Scott ............................ 95/29
4,347,983 A * 9/1982 Bodai ......................... 239/466
4,833,883 A 5/1989 Oda et al.
5,764,142 A 6/1998 Anderson et al.
5,824,136 A 10/1998 Meline
6,467,350 B1 10/2002 Kaduchak et al.
6,515,589 B2 * 2/2003 Schneider et al. ........... 340/630
6,749,666 B2 6/2004 Meegan, Jr.
6,920,399 B2 7/2005 Priev et al.
7,091,869 B2 8/2006 Forster et al.

FOREIGN PATENT DOCUMENTS

WO WO 2004/102499 A * 11/2004
WO WO 2006/050569 * 5/2006

OTHER PUBLICATIONS

Riera-Franco de Sarabia, E. et al. "Ultrasonic Agglomeration of Micron Aerosols Under Standing Wave Conditions", Journal of Sound and Vibration, vol. 110, No. 3, pp. 413-417.*
Haisch, C. et al., "Light and Sound- Photoacoustic Spectroscopy", Spectroscopy Europe, vol. 14, No. 5, 2002, pp. 10-15.*
J.A. Gallego-Juarez & E. Riera-Franco De Sarabia & G. Rodriguez-Corral, "Ultrasonic Aerosol Agglomeration at Low Mass Loadings", J. Aerosol Sci., 1988, vol. 19, No. 7, pp. 1377-1380.
K.M. Martin & O.A. Ezekoye, "Acoustic Filtratiotn and Sedimentation of Soot Particles", Experiments in Fluids, Dec. 1997, vol. 23, No. 6, one page.
"Photoacoustic Smoke Detector", Fachhochschule Aargau, Sep. 27, 2006, one page.

* cited by examiner

*Primary Examiner*—Daniel S Larkin
(74) *Attorney, Agent, or Firm*—Husch Blackwell Sanders Welsh & Katz

(57) ABSTRACT

An aspirated smoke detector includes a flow path and a generator of acoustic waves in the flow path. Airborne particulate matter in the flow path responds to the acoustic field by particle agglomeration; the resulting larger particles flow into a photoelectric-type smoke sensor. A sensed level of particles can be processed, or compared to one or more predetermined thresholds to establish presence of one or more predetermined conditions.

17 Claims, 1 Drawing Sheet

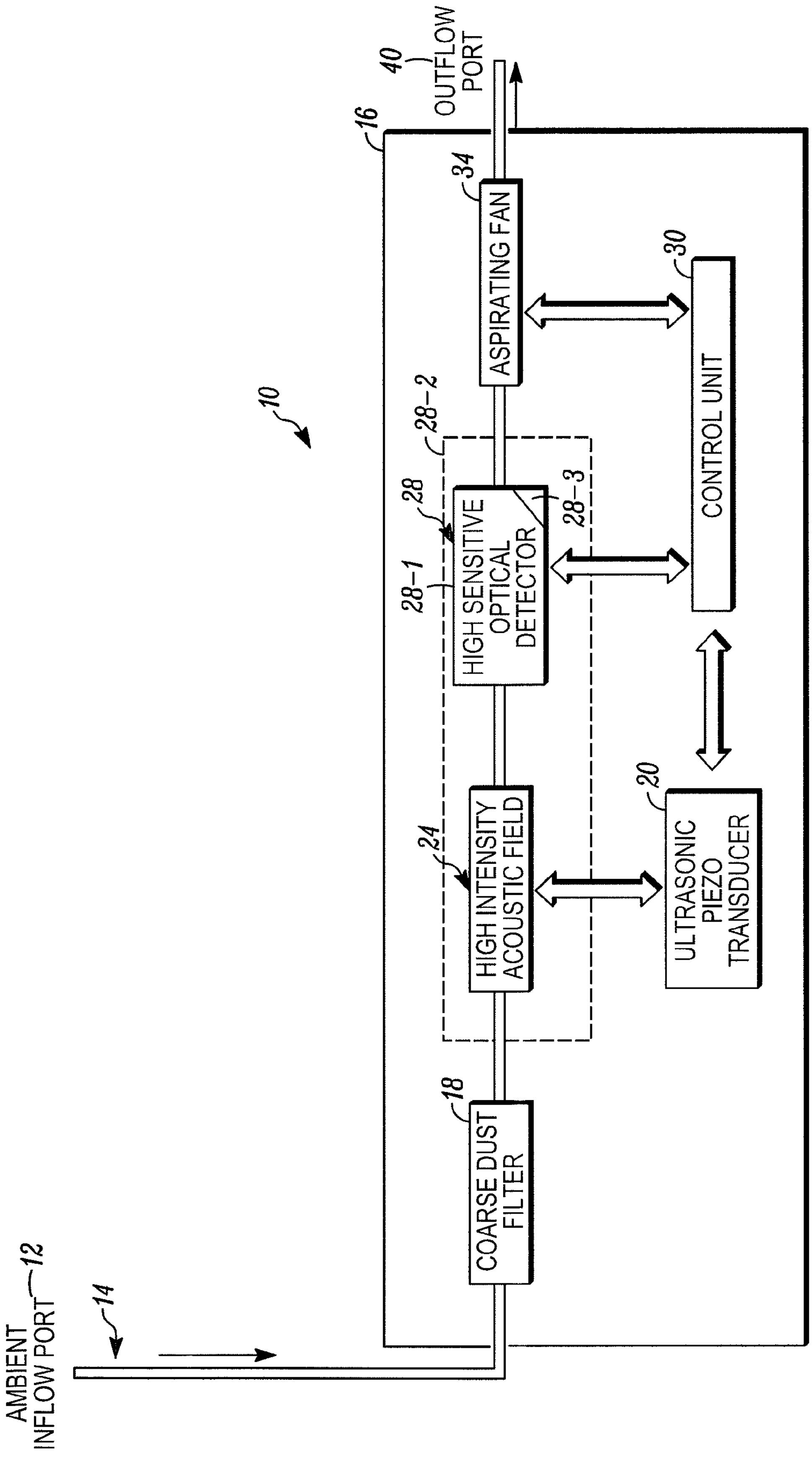
10
16
40
OUTFLOW PORT
34
ASPIRATING FAN
30
CONTROL UNIT
28-2
28
28-3
28-1
HIGH SENSITIVE OPTICAL DETECTOR
24
HIGH INTENSITY ACOUSTIC FIELD
20
ULTRASONIC PIEZO TRANSDUCER
18
COARSE DUST FILTER
12
14
AMBIENT INFLOW PORT

SMOKE DETECTORS

FIELD

The invention pertains to aspirated smoke detectors. More particularly, the invention pertains to such detectors which include a source of acoustic waves which can be used to agglomerate airborne particulate matter into larger particles that then flow into a smoke sensor.

BACKGROUND

Optical sensing techniques, usable in smoke detectors, can be classified as transmission and light scattering techniques. Transmission measurements in early fire detection require impractically long optical paths. Intensity of the scattered signal depends on many factors besides the number of particles per unit volume and intensity of incident light. Modest improvements of light scattering signal at low smoke densities can be achieved by optimizing wavelength, scattering angle, detector sensitivity, intensity of the incident light, and polarization state of the incident light.

Acoustic agglomeration of aerosols and colloids is a well-known technique to manage fine particulate matter in pharmaceutical, environmental and other industrial applications. Basic concept is based on forming standing wave in acoustic resonator. Acoustic (usually ultrasound) pressure forces both small and large particles to jiggle along with air molecules. However, larger particles have a larger slip factor and are not able to follow air movement (this is particularly true at ultrasonic frequencies) as well as smaller particles can. As a result, aerosol particles experience increased collision frequency as compared to collision due to thermal motion alone.

Each collision may result in coagulation of particles where smaller particles disappear and larger particles emerge. As larger particles get formed, they tend to move to a location of one or more nodes in the acoustic field where they start to agglomerate (a phenomena called flocculation). If the field is powerful enough they tend to levitate. In sum, if a standing wave resonant acoustic field is established in a space containing a small concentration of aerosols then in a few seconds, those particles will coagulate into larger particles at nodes of the acoustic field.

Optical smoke detectors are advantageous in that they will respond to smoldering-type fires and potentially can provide early warnings thereof. Such technologies are also usually readily acceptable world wide.

There is thus a continuing need to improve performance of optical-type smoke detectors. Preferably, sensitivity could be increased without at the same time increasing incidences of false alarms.

BRIEF DESCRIPTION OF THE DRAWINGS

FIG. 1 is a block diagram of an apparatus which embodies the invention.

DETAILED DESCRIPTION

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In accordance with the invention, the size distribution function of smoke can be changed by applying a high intensity resonant acoustic field. An acoustic field forces particles to move along with the field but big particles do not follow the field as readily as small ones. Increased collision frequency of particles ultimately forms one large particle levitating in the node of the acoustic field that is much easier to detect using a conventional light scattering technique.

Advantageously, in embodiments of the invention, a light scattering signal can be amplified hundreds of times if all particles collapse into a single one at very low densities. This technique would work for any type of photoelectric detector. However, the preferred embodiment would be to apply the acoustic field to a flow path of an aspirated type detector.

In an aspect of the invention, airflow is controlled by the aspiration system rather than by environmental conditions and acoustic trapping would be under better control. In such conditions it is possible to vary the duration of levitation period and monitor growth of the resulting particle that can be correlated to the fire conditions. Another advantage of the aspirated system is that power consumption is usually not as critical as it is with spot-type photoelectric detectors. Yet another benefit is that spatial restrictions on the system are not stringent and it would be possible to confine the acoustic field to a detector enclosure.

Finally, additional sensing techniques can be used in combination to improve nuisance immunity of the system. This may include use of multiple color scattering signals, additional gas sensors or monitoring heating of particles upon illumination by a high-intensity light source, by photothermal beam deflection or other suitable technique all without limitation.

A detector 10 in accordance with the invention is illustrated in FIG. 1. Detector 10 includes an inflow port 12 which is coupled a flow pipe 14 carried by a housing 16. The pipe 14 provides a bounded, internal flow path for ambient particulate carrying atmosphere.

In one aspect of the invention, a dust filter 18 can be included in the flow path formed by the pipe 14. Those of skill will understand that filtering element 18 is optional.

Detector 10 incorporates an ultrasonic piezoelectronic transducer 20 which generates a high intensity acoustic field which can be coupled to a region 24 in the flow path formed by the pipe 14. The region 24 can be a bounded region in which the acoustic field is generated as would be understood by those of skill in the art.

The transducer 20 could resonate at a 40 kilohertz rate with a selected, even, number of wave lengths. Those of skill will understand that a transducer, such as a transducer 20 can generate an ultrasonic standing wave on the order of 140 dB in the region 24. Such a field is capable of levitating selected air borne particulate matter, for example smoke particles.

In accordance with the invention, when the transducer 20 generates the acoustic field in the region 24 particulate agglomeration occurs at nodes of the field therein. In one aspect of the invention, the field generated in the region 24 functions as an acoustic trap for very small particles. Alternately, it can be considered an integrating effect which creates a plurality of larger particles which then move from the field into a housing 28 for an optical-type smoke sensor or smoke detector.

Those of skill in the art will understand that a variety of configurations of optical smoke sensor 28 could be used in combination with the transducer 20. In one aspect of the invention, the field generated in the region 24 could extend to an interior region of a housing 28-1 of the sensor 28. In this embodiment housing 28-1 can be eliminated exposing the elements of sensor 28. An expanded housing 28-2 could include both the field in the region 24 and the sensor 28 as shown in phantom. In this embodiment the agglomerated particles could be detected by sensor 28 while still in the acoustic field.

The housing 28-1 for 28-2 of the sensor 28 can incorporate a light source, for example a light emitting diode, and an off-set sensor, such as a photo diode, to detect scattering of light due to the agglomerated particles formed in region 24 by the acoustic field.

A control unit 30 can be coupled to the transducer and the sensor 28. Those of skill will understand that the control unit could include a programmable processor and associated control software as well as interface circuits to properly drive the transducer 20 and to generate signals to the optical sensor 28 to energize the light source therein.

Signals from the optical smoke sensor 28 could be coupled to the control unit 30 for analysis and a determination as to the existence of one or more predetermined smoke related conditions. As those of skill in the art will understand, predetermined conditions could include a pre-alarm condition, or a fire alarm condition all without limitation.

The unit 10 can also incorporate an optional aspiration device, such as a fan 34, which is also coupled to the control unit 30. It will be understood that a variety of fans, blowers or other mechanical movable devices could be used all without limitation. Electronic aspirating devices also come within the spirit and scope of the present invention.

Control unit 30 could vary the flow rate induced by the device 34 to adjust "growth time" of the particles. Unit 30 also variably controls the transducer 20 to alter the field 24 as would be understood by those of skill in the art.

Additionally, a microphone 28-3 can be located in the vicinity of the sensing region of smoke sensor 28. The control unit 30 could modulate illumination of the optical source in sensor 28. Signals responsive thereto could be fed to control unit 30 from microphone 28-3 to provide an audible indicator thereto as to the presence of particles that absorb light. Sensor 28 could also include an ionization-type smoke sensor, a gas sensor and a thermal sensor, all coupled to control unit 30 to provide multi-criteria sensing.

Ambient atmosphere which has traveled through the flow path formed by pipe 14 exits detector 10 via outflow port 40.

One form of an optical smoke detector, such as a detector 28, is disclosed in the U.S. Pat. No. 5,764,142 entitled "Fire Alarm System With Smoke Particle Discrimination" assigned to the assignee hereof and incorporated by reference.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications that fall within the scope of the claims.

What is claimed is:

1. A smoke detector comprising:

a housing;

a flow path for ambient atmosphere carried by the housing;

a source of ultrasonic signals carried by the housing, the source generating an acoustic field of a predetermined intensity in at least a portion of the flow path; and a smoke sensor coupled to the path, the sensor receives particulate matter carried by the ambient atmosphere in the flow path subsequent to that particulate matter having been exposed to the acoustic field where the acoustic field coagulates particulate matter carried by the ambient atmosphere prior to that particulate matter entering a sensing region of the sensor.

2. A detector as in claim 1 which includes an aspirating element that induces movement of ambient atmosphere along the flow path.

3. A detector as in claim 1 where the source comprises an ultrasonic transducer.

4. A detector as in claim 3 which includes an aspirating element that induces movement of ambient atmosphere along the flow path.

5. A detector as in claim 4 where the sensor comprises at least one of an optical-type sensor, an ionization-type sensor, a gas sensor and a thermal sensor.

6. A detector as in claim 4 where the aspirating element moves the particulate matter to a sensing region of the sensor.

7. A detector as in claim 1 where the sensor comprises one of an optical-type or an ionization-type sensor particulate sensor.

8. A detector as in claim 7 where the sensor comprises a photo-electric type smoke sensor.

9. A detector as in claim 8 which includes control circuits coupled to the transducer and the sensor.

10. A detector as in claim 9 where the aspirating element includes an electrically actuatable flow inducing member.

11. A detector as in claim 10 where control circuits are coupled to the aspirating element.

12. A detector as in claim 11 which includes a filter in the flow path.

13. A detector as in claim 7 where the acoustic field extends, in part, into the sensing region.

14. A method comprising:

producing a flow of particulate carrying ambient atmosphere to be sensed;

generating an acoustic field of a selected intensity;

directing the flow through the field thereby producing a flow of coagulated particles; and sensing the coagulated particles and which includes comparing sensed coagulated particles to a predetermined level and generating an output signal indicative thereof.

15. A method as in claim 14 which includes confining the acoustic field at a predetermined region.

16. A method comprising:

producing a flow of particulate carrying ambient atmosphere to be sensed;

generating an acoustic field of a selected intensity;

directing the flow through the field thereby producing a flow of coagulated particles;

sensing the coagulated particles and which includes energizing a selected transducer to produce the acoustic field.

17. A method as in claim 16 where energizing includes producing a standing wave resonant acoustic field in the region.

* * * * *